Apr. 10, 1923.

W. M. CRUZAN 1,451,254

FRUIT PITTER

Filed Sept. 21, 1922

Inventor
W. M. CRUZAN

By

Attorney

Apr. 10, 1923.  1,451,254
W. M. CRUZAN
FRUIT PITTER
Filed Sept. 21, 1922   2 sheets-sheet 2
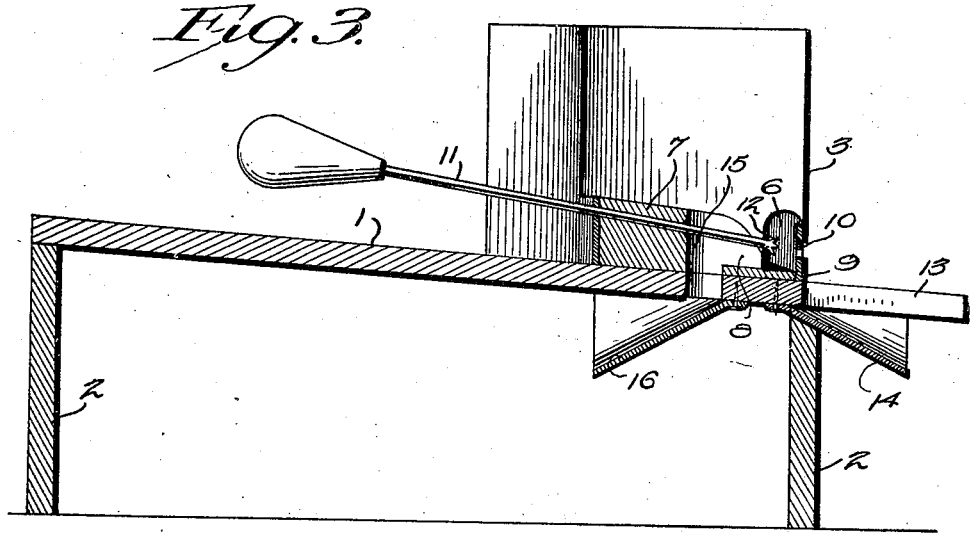
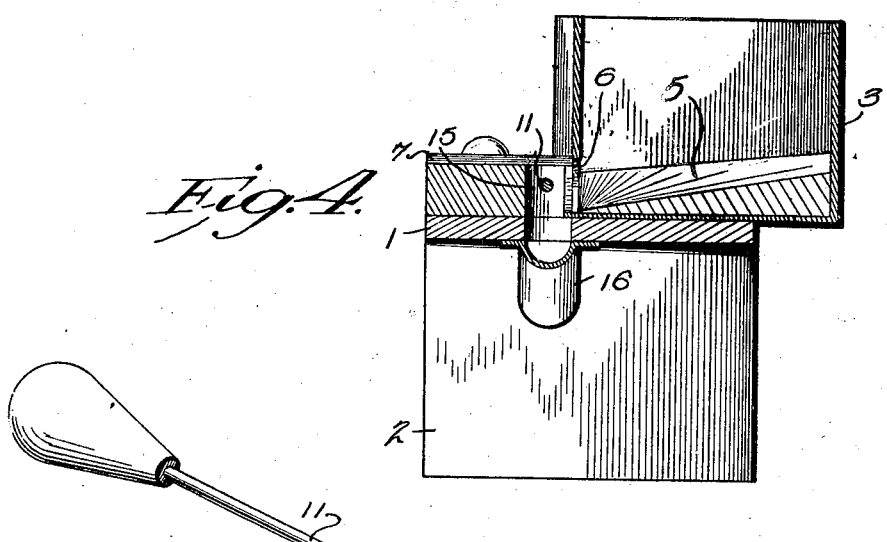
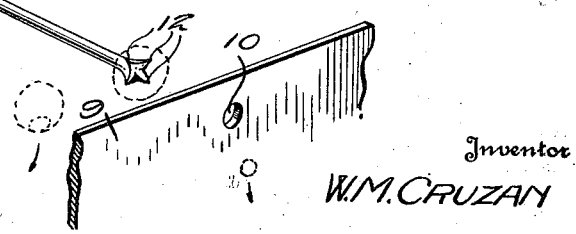
Inventor
W. M. CRUZAN
By
Attorney Patented Apr. 10, 1923.

1,451,254

UNITED STATES PATENT OFFICE.

WAYNE M. CRUZAN, OF EUREKA, KANSAS.

FRUIT PITTER.

Application filed September 21, 1922. Serial No. 589,630.

*To all whom it may concern:*

Be it known that I, WAYNE M. CRUZAN, a citizen of the United States, residing at Eureka, in the county of Greenwood and State of Kansas, have invented certain new and useful Improvements in Fruit Pitters, of which the following is a specification.

This invention relates to fruit pitters, and more particularly to cherry pitters.

An object of the invention is the provision of means for removing fruit pits without crushing the fruit.

A further object is the provision of means for expelling the pits so that they may be collecting in one receptacle, and collecting the fruit in a separate receptacle.

In the present invention, I provide a container adapted to feed fruit to a pitting chamber, having a plunger adapted to project through the fruit to remove the pit and deliver it through an opening in the wall. The fruit is retained on the plunger during its rearward movement and is delivered through an opening in the bottom of the fruit chamber, whence it may be collected in a suitable receptacle.

In the accompanying drawings, I have shown one embodiment of the invention. In this showing:

Figure 3 is a vertical sectional view on line 3—3 of Figure 2,

Figure 4 is a transverse vertical sectional view on line 4—4 of Figure 2, and,

Figure 5 is a detail view of the plunger, illustrating the discharge of the pit and fruit.

Figure 1:
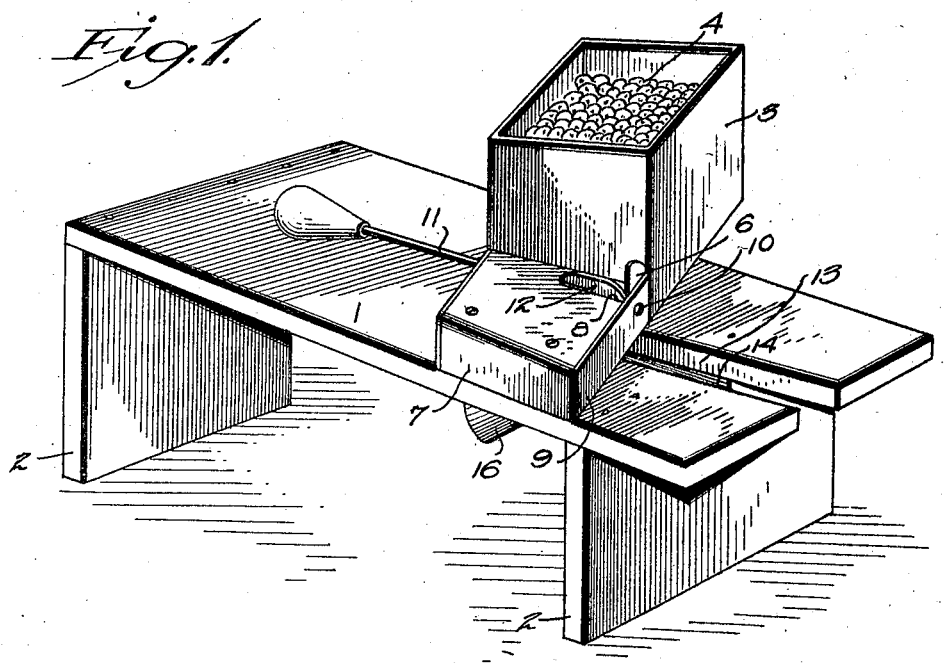
Figure 1 is a perspective view of the device.
Figure 2:
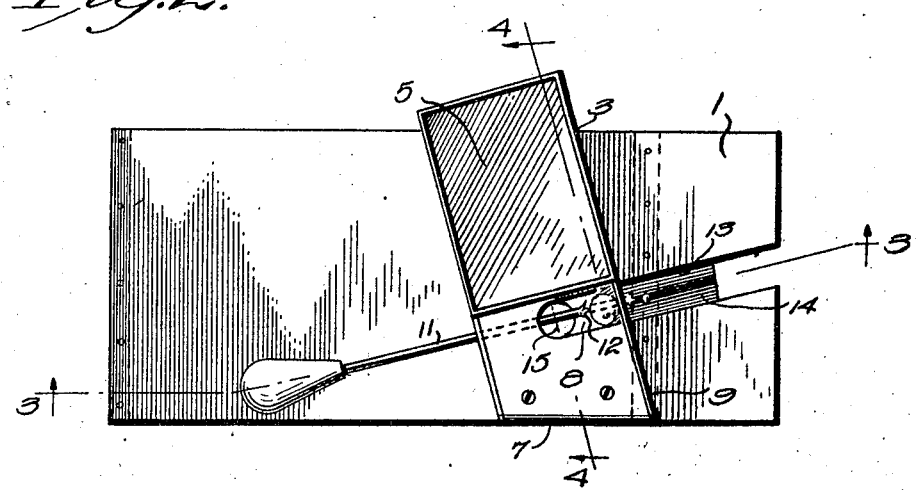
Figure 2 is a plan view.

Referring to the drawings, the reference numeral 1 designates a table supported on suitable legs 2. As shown, the table may be arranged at a slight incline. A container 3 is supported on the table, the container being adapted to receive cherries 4 or other fruit. The bottom of the container is arranged at an incline, as indicated at 5, and is adapted to deliver the fruit to the forward end of the same. This end of the container is provided with an outlet opening 6. A block 7 is arranged on the table, and this block is provided with a cut-out portion forming a pitting chamber 8. The front of this chamber is closed by a plate 9, having an opening 10 formed therein. The fruit to be pitted is fed from the container 3 into the pitting chamber and assumes a position against the side wall, as indicated in Figure 2 of the drawings. A plunger 11 is mounted to reciprocate in the pitting chamber and the forward end of this plunger is provided with a plurality of prongs 12. Adjacent the front wall of the pitting chamber, the table is provided with a slot 13, communicating with a trough or chute 14. Adjacent the rear of the pitting chamber, the table is provided with an opening 15 communicating with a trough or chute 16.

The operation of the device is as follows:

The fruit in the receptacle 3 passes through the opening 6 to the position shown in Figure 2 of the drawings in alinement with the plunger 11. The plunger is then thrust forwardly, forcing the pit from the fruit through the opening 10, whence it falls into the chute 14 and may be conveyed to a suitable receptacle. In passing through the fruit, the plunger makes a relatively clean cut and does not crush the fruit or force the juice therefrom. The prongs 12 retain the fruit on the plunger during its rearward movement until it contacts with the rear wall of the pitting chamber. Further rearward movement of the plunger removes the fruit therefrom, whence it passes through the opening 15 into the chute 16 to a suitable collecting receptacle.

It will be apparent that the device permits the fruit to be pitted without crushing the fruit or squeezing the juice therefrom, and further permits the collection of fruit and pits in separate receptacles.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A fruit pitter comprising a receptacle provided with a discharge opening in one side and having a sloping bottom whereby fruit is fed toward said opening, a block arranged adjacent said receptacle and provided with a pitting chamber arranged adjacent said discharge opening to receive the fruit therefrom, a plate forming a closure for the forward end of said pitting chamber and provided with an opening, and a plunger journaled in said block in alinement with the opening in said plate, said plunger being provided with prongs adapted to retain the fruit thereon upon removal of the pit, said prongs being adapted to project through the opening in said plate upon inward movement of said plunger to eject the pit and to contact with the rear wall of said pitting chamber upon outward movement of said plunger to limit the movement of the plunger and remove the pitted fruit therefrom, said pitting chamber being provided in its bottom with an opening adjacent the rear wall of said pitting chamber for the passage of the pitted fruit.

2. A fruit pitter comprising a support, a receptacle provided with a discharge opening in one side and having a sloping bottom whereby fruit is fed toward said opening, a block arranged adjacent said receptacle and provided with a pitting chamber arranged adjacent said discharge opening to receive the fruit therefrom, a plate forming a closure for the forward end of said pitting chamber and provided with an opening, and a plunger journaled in said block in alinement with the opening in said plate, said plunger being provided with prongs adapted to retain the fruit thereon upon removal of the pit, said prongs being adapted to project through the opening in said plate upon inward movement of said plunger to eject the pit and to contact with the rear wall of said pitting chamber upon outward movement of said plunger to limit the movement of the plunger and remove the pitted fruit therefrom, said pitting chamber being provided in its bottom with an opening adjacent the rear wall of said pitting chamber for the passage of the pitted fruit, said plunger being provided with an operating handle and being arranged at an angle to the forward edge of said support whereby said handle is arranged adjacent and movable away from the edge of the support when the plunger is moved inwardly.

In testimony whereof, I affix my signature in presence of two witnesses.

WAYNE M. CRUZAN.

Witnesses:
S. J. POLHAMUS,
D. F. ALMACK.